United States Patent
Tidd

(10) Patent No.: US 9,355,429 B1
(45) Date of Patent: *May 31, 2016

(54) CLIENT COMPUTING SYSTEM FOR AND METHOD OF RECEIVING CROSS-PLATFORM REMOTE ACCESS TO 3D GRAPHICS APPLICATIONS

(71) Applicant: hopTo Inc., Campbell, CA (US)

(72) Inventor: William Tidd, Alton Bay, NH (US)

(73) Assignee: HOPTO INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,325

(22) Filed: Apr. 21, 2014

Related U.S. Application Data

(63) Continuation of application No. 13/341,086, filed on Dec. 30, 2011, now Pat. No. 8,745,173.

(51) Int. Cl.
| | | |
|---|---|---|
| *G06F 15/16* | (2006.01) | |
| *G06T 1/20* | (2006.01) | |
| *H04L 29/08* | (2006.01) | |
| *G06F 3/14* | (2006.01) | |
| *G06T 15/00* | (2011.01) | |
| *G06F 9/48* | (2006.01) | |

(52) U.S. Cl.
CPC ... *G06T 1/20* (2013.01); *G06F 3/14* (2013.01); *G06F 9/4856* (2013.01); *G06T 15/005* (2013.01); *H04L 67/2866* (2013.01)

(58) Field of Classification Search
CPC ........ G06F 3/14; G06F 9/4856; G06T 15/005
USPC ........................................................ 709/219
See application file for complete search history.

(56) References Cited

U.S. PATENT DOCUMENTS

| | | |
|---|---|---|
| 6,104,392 A | 8/2000 | Shaw et al. |
| 6,216,151 B1 | 4/2001 | Antoun |
| 6,831,635 B2 | 12/2004 | Boyd et al. |
| 7,432,934 B2 | 10/2008 | Salazar et al. |
| 8,001,531 B1 | 8/2011 | Rideout et al. |
| 8,035,636 B1 | 10/2011 | Yang |
| 8,171,154 B2 | 5/2012 | Vonog et al. |
| 8,253,732 B2 | 8/2012 | Hamill et al. |
| 8,264,494 B2 | 9/2012 | Kilani et al. |
| 8,266,232 B2 | 9/2012 | Piper et al. |
| 8,745,173 B1 | 6/2014 | Tidd |
| 8,754,900 B2 | 6/2014 | Koneru et al. |
| 8,766,990 B1 | 7/2014 | Tidd |
| 8,769,052 B1 | 7/2014 | Tidd |

(Continued)

OTHER PUBLICATIONS

U.S. Appl. No. 13/341,049 Final Office Action mailed Aug. 12, 2014.

(Continued)

*Primary Examiner* — Richard G Keehn
(74) *Attorney, Agent, or Firm* — Polsinelli LLP

(57) ABSTRACT

A client computing system in a client-server computing environment includes a client display driver that receives a transmission from a server, decodes graphics commands from the transmission using a client application, executes the functions using a client 3D library stored in a memory of the client, and renders the resulting image data to a display. The client may transmit capability information to the server, allowing the resolution of differences between the graphics application programming interfaces (APIs) supported on the server and the client.

15 Claims, 4 Drawing Sheets

(56) References Cited

U.S. PATENT DOCUMENTS

| | | |
|---|---|---|
| 8,799,357 B2 | 8/2014 | Clift et al. |
| 8,838,749 B1 | 9/2014 | Tidd |
| 8,922,569 B1 | 12/2014 | Tidd |
| 9,219,779 B1 | 12/2015 | Tidd |
| 2006/0082581 A1 | 4/2006 | Schmieder et al. |
| 2006/0082582 A1 | 4/2006 | Schmieder et al. |
| 2006/0082583 A1 | 4/2006 | Leichtling et al. |
| 2006/0085550 A1 | 4/2006 | Schmieder et al. |
| 2006/0087512 A1 | 4/2006 | Schmieder et al. |
| 2006/0176296 A1* | 8/2006 | Hoffman et al. .......... 345/419 |
| 2006/0284867 A1 | 12/2006 | Ishikawa et al. |
| 2007/0171222 A1* | 7/2007 | Kowalski .......... 345/420 |
| 2008/0165198 A1* | 7/2008 | Bakalash et al. .......... 345/505 |
| 2008/0316218 A1 | 12/2008 | Kilani et al. |
| 2009/0195537 A1 | 8/2009 | Qiu et al. |
| 2009/0207167 A1 | 8/2009 | Pasetto |
| 2009/0231329 A1* | 9/2009 | Swaminathan et al. ...... 345/419 |
| 2010/0131944 A1* | 5/2010 | Iorio et al. .......... 718/1 |
| 2010/0134494 A1 | 6/2010 | Lim et al. |
| 2010/0220098 A1* | 9/2010 | Holler et al. .......... 345/419 |
| 2010/0254603 A1* | 10/2010 | Rivera .......... 382/173 |
| 2010/0306783 A1 | 12/2010 | Dake |
| 2011/0045891 A1* | 2/2011 | Ansari .......... 463/20 |
| 2012/0059881 A1* | 3/2012 | Koster et al. .......... 709/204 |
| 2012/0075346 A1* | 3/2012 | Malladi et al. .......... 345/660 |
| 2012/0084456 A1 | 4/2012 | Vonog et al. |
| 2012/0117145 A1 | 5/2012 | Clift et al. |
| 2012/0154389 A1* | 6/2012 | Bohan et al. .......... 345/419 |
| 2012/0166967 A1 | 6/2012 | Deimbacher et al. |
| 2012/0246227 A1 | 9/2012 | Vonog et al. |
| 2012/0254450 A1 | 10/2012 | Lejeune et al. |
| 2012/0329559 A1 | 12/2012 | Mahajan et al. |
| 2013/0047189 A1 | 2/2013 | Raveendran et al. |
| 2013/0307847 A1 | 11/2013 | Dey et al. |

OTHER PUBLICATIONS

U.S. Appl. No. 13/399,717 Final Office Action mailed Aug. 12, 2014.
U.S. Appl. No. 14/276,248 Office Action mailed Oct. 8, 2014.
Spice for Newbies [online], Red Hat, Inc. 2009 [retrieved on May 13, 2013]. Retrieved from the Internet: <http://webcache.googleusercontent.com/search?q=cache:Wlu_klkfuVAJ:spice-space.org/wiki/images/1/17/Spice_for_newbies.odt+(translate+%7C+convert+%7C+cross+%7C+adapt+%7C+encode+%7C+transcode)+AROUND(15)+((graphic+%7C+CG)+AROUND(2)+(call+%7C+comman.
U.S. Appl. No. 13/341,049 Office Action mailed Feb. 20, 2014.
U.S. Appl. No. 13/399,717 Office Action mailed Feb. 14, 2014.
U.S. Appl. No. 13/341,086 Office Action mailed Nov. 7, 2013.
U.S. Appl. No. 13/399,738 Final Office Action dated Dec. 4, 2013.
U.S. Appl. No. 13/399,738 Office Action dated Jun. 25, 2013.
U.S. Appl. No. 13/341,570 Final Office Action dated Dec. 16, 2013.
U.S. Appl. No. 13/341,570 Office Action dated May 16, 2013.
U.S. Appl. No. 13/399,764 Office Action dated Nov. 6, 2013.
U.S. Appl. No. 14/447,226 Office Action mailed Mar. 13, 2015.
U.S. Appl. No. 13/341,049 Office Action mailed Jul. 6, 2015.
U.S. Appl. No. 13/399,717 Office Action mailed Jul. 6, 2015.
Jurgelionis et al., A.; "Distributed Video Game Streaming System for Pervasive Gaming" (2009), International Journal of Computer Games Technology, Article ID 231863, pp. 1-6 [retrieved from http://iphome.hhi.de/eisert/papers/streamingday09.pdf].
Wright et al., R.; "OpenGL SuperBible" (2005) 3rd Edition, Sams Publishing, pp. 679-685.
U.S. Appl. No. 14/276,179 Office Action mailed Sep. 10, 2015.

* cited by examiner

US 9,355,429 B1

CLIENT COMPUTING SYSTEM FOR AND METHOD OF RECEIVING CROSS-PLATFORM REMOTE ACCESS TO 3D GRAPHICS APPLICATIONS

CROSS-REFERENCE TO RELATED PATENTS

The present application is a continuation and claims the priority benefit of U.S. patent application Ser. No. 13/341,086 filed Dec. 30, 2011, the disclosure of which is incorporated herein by reference.

The present application is related to U.S. patent application Ser. No. 08/472,935 filed Jun. 6, 1995, now U.S. Pat. No. 5,831,609, the disclosure of which is incorporated herein by reference.

TECHNICAL FIELD

The present disclosure relates generally to a client computing system in a client-server computing environment, and more particularly to a client computing system for and method of receiving cross-platform remote access to 3D graphics applications.

BACKGROUND

In a client-server computing system, a computer application or program that is running on one computer (i.e., the server) may be accessible to another computer (i.e., the client) over a network, such as over the Internet. The user interface running on the server is exposed and visible to the client. In this way, the client has remote access to the server and the user of the client device can interact with the application that is running on the server.

The server application may be, for example, an application that processes two-dimensional (2D) and/or three-dimensional (3D) graphics. In this example, a 2D and/or 3D graphics application may be used to render graphical objects on a computer display. Currently, in a client-server computing system, the high-level graphics representation (e.g., Direct3D, OpenGL) is reduced to an image (e.g., a bitmap image) at the server. The image is then transmitted from the server to the client over the network. Once received at the client, the image is rendered on the client display. Creating, compressing, and transmitting these image files may result in high CPU utilization (i.e., computing load) at the server, especially when the application displays objects in motion and when there are a large number of remote users sharing the server. Further, images are often large and, therefore, transmitting images to a large number of remote users consumes a large amount of network bandwidth.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a client computing system in a client-server computing environment that receives and executes graphic commands and methods of efficiently displaying graphic objects on the client computing system located remotely from a computer (server) that is running a 3D graphics application. The client computing system of the disclosure exhibits numerous advantages over existing systems. In various embodiments, the client computing system of the disclosure and associated methods may enable a client user to receive 3D graphics application capabilities with faster speeds, particularly when a large number of clients are operatively connected to the server or the client-server computing environment has low network bandwidth. Further, the client computing system of the disclosure may be configured to operate on a different platform than the server.

Figure 1:
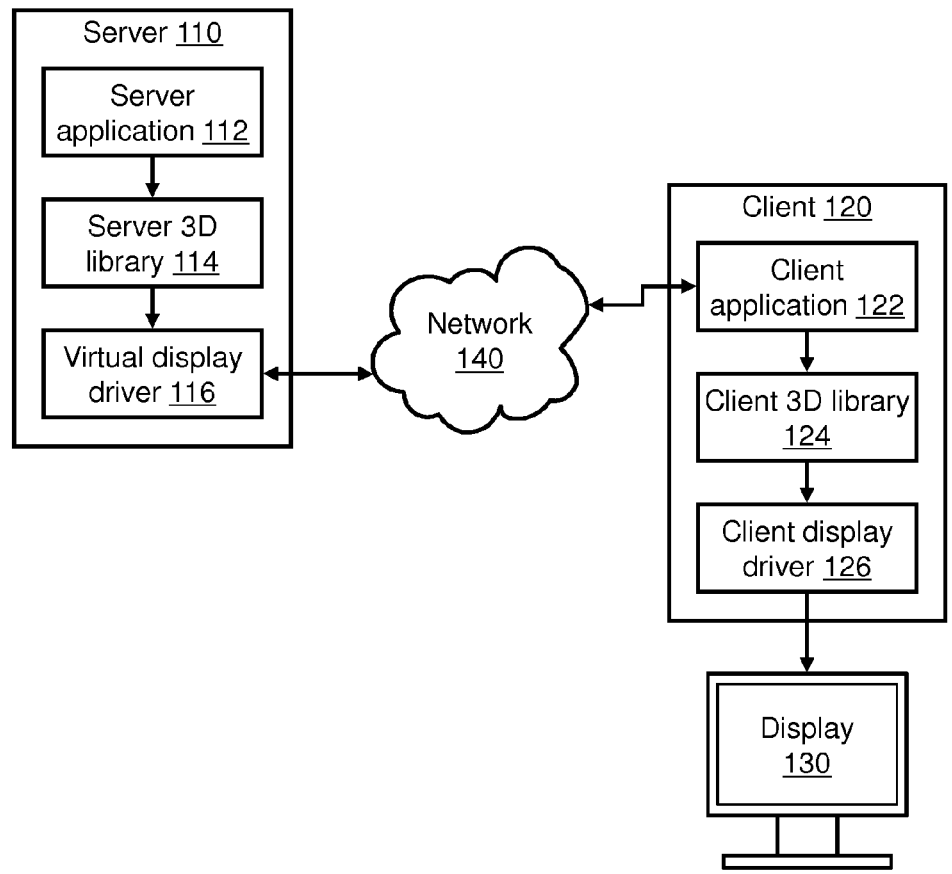
FIG. 1 illustrates a block diagram of a client-server computing system for providing cross-platform remote access to 3D graphics applications, according to the present disclosure.

FIG. 1 illustrates a block diagram of a client-server computing system 100 for providing cross-platform remote access to 3D graphics applications. Client-server computing system 100 includes a server 110 that is operatively connected to a client 120 and a display 130 via a network 140. Network 140 may be, for example, a local area network (LAN) and/or a wide area network (WAN) for connecting to the Internet. Entities of client-server computing system 100 may connect to network 140 by any wired and/or wireless means.

While client 120 and display 130 are illustrated as separate physical components (e.g., illustrative of a common implementation of a desktop or a workstation computing system, such as clients running natively on Windows, Linux, UNIX, and Mac OS X operating system), the capabilities of such separate components can also be integrated in a single device (e.g., a mobile device or a tablet computer). For example, the mobile device can be an iPad tablet computer on the iOS operating system (Apple Inc., Cupertino, Calif.), or other mobile client on either the Android operating system (Google Inc., Mountain View, Calif.) or the Windows CE operating system (Microsoft Corp., Redmond, Wash.). Thus, as used herein, the terms "client" or "client computer" should be understood to include any such implementations.

Server 110 includes a server application 112, a server 3D library 114, and a virtual display driver 116 that, in accordance with the client-server model of computing, collectively function to enable server 110 to provide various resources or services to client 120, which may be located remotely from the server. In accordance with the present disclosure, these resources or services pertain to computer graphics.

Client 120 is a client computing system that includes a client application 122, a client 3D library 124, and a client display driver 126. Collectively, these elements function to enable the client and the client user to consume computer graphics resources or services provided by server 110.

Server application 112 represents an application executing (i.e., "running") on server 110. The functionality of server application 112 shall be visible to and accessible by client 120 via network 140. For example, server application 112 may be a computer-aided design (CAD) application, such as AutoCAD (Autodesk, Inc., San Rafael, Calif., USA) or Cadence Virtuoso (Cadence Design Systems, San Jose, Calif.); a medical clinical workflow application, such as Symbia.net (Siemens AG, Munich, Germany); an interactive mapping application, such as Google Earth (Google, Inc.) or a 3D game. The functionality of server application 112 shall be visible to and accessible by client 120 via network 140. For example, the functionality of server application 112 may be accessed from client 120 using a process herein known as application publishing, which is currently supported by products such as GraphOn GO-Global, Microsoft Remote Desktop Services and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems," which is incorporated by reference as though fully set forth herein.

Client application 122 represents an application installed on and executing on client 120 that emulates a user interface of server application 112. For example, the client application may run in a browser and be implemented in a scripting language, such as JavaScript, a multimedia platform, such as Adobe Flash, or as a browser add-on (e.g., ActiveX control for Internet Explorer). Additionally, client application 122 may run as a standalone application. Client application 122 may receive various input commands from the user via an input device (not shown in FIG. 1), then transmit these commands to server 110, and update the user interface of client application 122 in response to computer graphics commands transmitted from server 110 back to client 120 over network 140.

Server 3D library 114 and client 3D library 124 provide a set of common interfaces or graphics functions to server 110 and client 120, respectively. These components are also referred to herein as a high-level graphics language or a graphics application programming interface (API). In one embodiment of the disclosure, both server 110 and client 120 utilize a library, such as OpenGL (Khronos Group, Beaverton, Oreg.). This enables server 110 and client 120 to communicate at an interface or a graphics functions level, even if server 110 operates on a different computing platform from client 120. This is in contrast to conventional client-server computing systems that have utilized operating system specific APIs to accomplish computer graphics rendering, which should not be considered cross-platform.

Virtual display driver 116 is a software code module that enables commands or functions that are called in server 3D library 114 to be marshaled (i.e., encoded) and transmitted to client 120 over network 140. Marshaling (or marshalling) is the process of transforming the memory representation of such commands to a data format suitable for transmission via network 140. For example, the display driver assigns an ID to each graphics function and converts function arguments from a platform-specific byte order into a common byte order that all clients can read, regardless of the native byte order of the client device. This encoding allows graphic objects and their motions to be represented much more efficiently than the conventional method of generating an image for each arrangement or view of the objects. Significantly less data must be compressed and transmitted by the server, greatly reducing CPU usage on the server and network bandwidth usage.

Client display driver 126 includes a software code module that receives marshaled data from server 110 via client application 122 and executes the 3D library functions using client 3D library 124. This enables client 120 to handle intensive graphics rendering operations, such as blending or shading, while enabling server 110 to share server application 112 with a larger pool of clients. This also reduces the bandwidth requirements of network 140 as pixel array image data (e.g., in the form of Bitmap image files) no longer needs to be transmitted from server 110 to individual clients, such as client 120, as was the case in conventional client-server computing systems.

Figure 2:
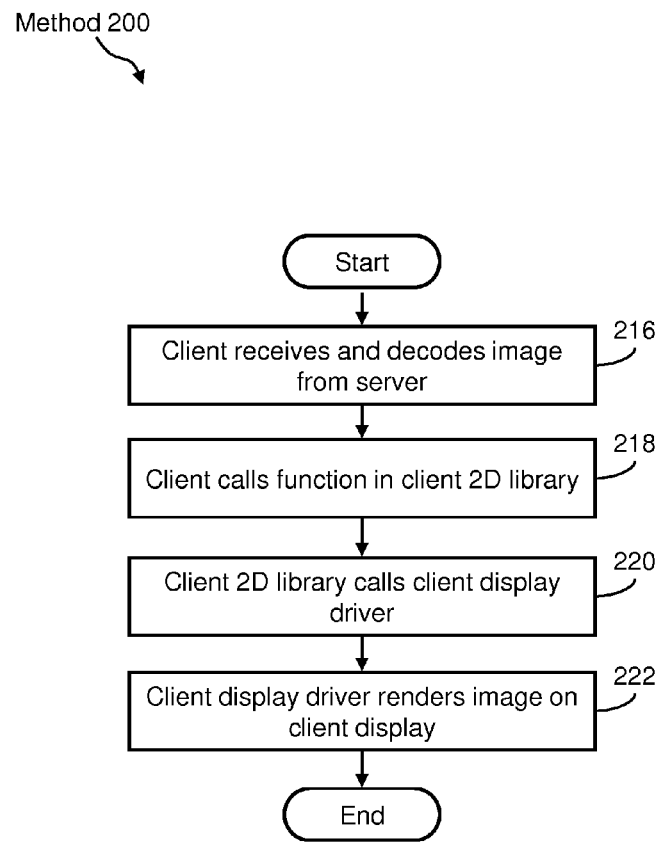
FIG. 2 illustrates a flow diagram of a conventional method of displaying graphic objects on a client in a client-server computing system.

By way of useful background, FIG. 2 illustrates a flow diagram of a conventional method 200 of displaying graphic objects on a client in a client-server computing system. The conventional method 200 may include the following steps.

At a step 210, a client component that is in direct network communication with a server receives and decodes a transmission from the server that includes an image (or a series of images). For example, the transmission may include bitmap image data. In comparison with the present disclosure, the data transmitted to the client will be substantially larger. The client component then forwards the information to a client application.

At a step 212, the client application calls or invokes a client 2D library with the image or series of images.

At a step 214, the client 2D library calls a client display driver with the image or image series.

At a step 216, the client display driver renders the pixel image array data as an image to the display (e.g., monitor) of the client computer.

Figure 3:
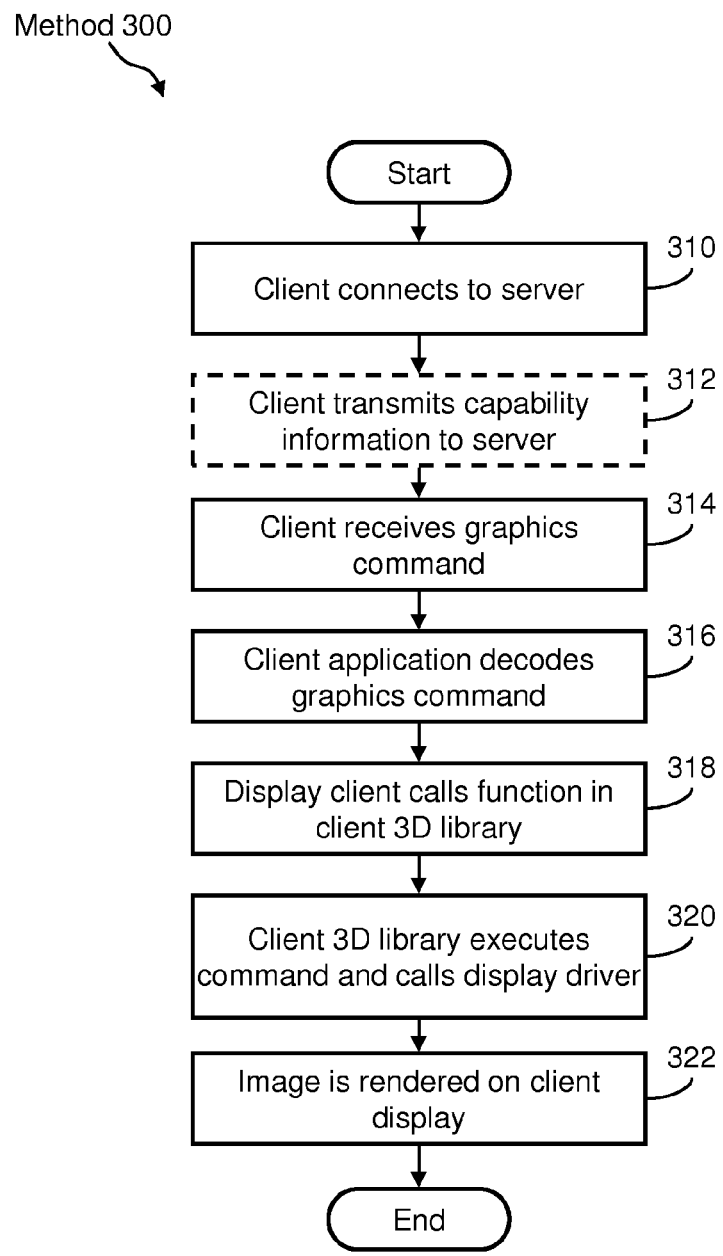
FIG. 3 illustrates a flow diagram of a method of displaying graphic objects on a client in a client-server computing system, according to the present disclosure.

FIG. 3 illustrates a flow diagram of a method 300 of displaying graphic objects on a client using client-server computing system 100 of the disclosure. Method 300 may include, but is not limited to, the following steps.

At a step 310, client 120 connects to server 110 via network 140 by a suitable connection of either conventional or novel design. For example, the connection may be established in accordance with a Transmission Control Protocol/Internet Protocol (TCP/IP) model as is known to one of skill.

At an optional step 312, client 120 exchanges capability information (i.e., negotiate protocols) with server 110. For example, the capability information transmitted from client 120 to server 110 may include information about the particular APIs (e.g., OpenGL windowing APIs) supported by client display driver 126. The capability information may include the version or versions of client 3D library 124 (e.g., OpenGL 3.2) that are available on client 120. The capability information may also include any extensions available on client 120 that can act as an adapter between the functionality of different versions of server 3D library 114 and client 3D library 124. This information may be transmitted in any format that is supported by the client/server system.

At a step 314, the client component that is in direct network communication with server 110 receives a transmission from a component of server 110 (e.g., virtual display driver 116). The client component then forwards the transmission to client application 122.

At a step 316, client application 122 decodes the graphics commands. This step may include, for example, reading (e.g., parsing) function names and function parameters from the server transmission into a format compatible with client 3D library 114. One of skill will recognize that specific details of decoding by client 120 may depend on the details of encoding employed by server 110, which could be received by client 120 as part of step 312.

At a step 318, client application 122 optionally performs additional preprocessing and formatting of the function and its parameters (for example, additional platform-specific or version-specific formatting). If client 120 has not yet initialized the 3D library 114 (e.g., Direct3D library, OpenGL library, etc.) that supports the command, it automatically loads and initializes the library. Client 120 then calls or invokes client 3D library 114 with the decoded function names and parameters that satisfy the request of client 120.

At a step 320, client 3D library 124 executes each of the graphic commands and calls client display driver 126 with the resulting pixel image array data. The actual implementation of each graphic command that is executed on client 120 (e.g., define a surface with a given texture, wrap surface around a sphere) is specific to the client's computing platform. For example, if the client is operating on a Windows platform, the execution of the graphics commands is, for example, a Windows OpenGL implementation. Calls to client 3D library 124 differs from conventional client-server computing systems where the client is making calls to a 2D library only because the bitmap image (or other form of image array data) has already been generated on the server and supplied to the client by the server.

At a step 322, client display driver 126 renders an image to display 130. For example, this step may include setting pixel image array data in a memory of the client display driver 120, which defines the image displayed on the computer's monitor or other form of display.

Figure 4:
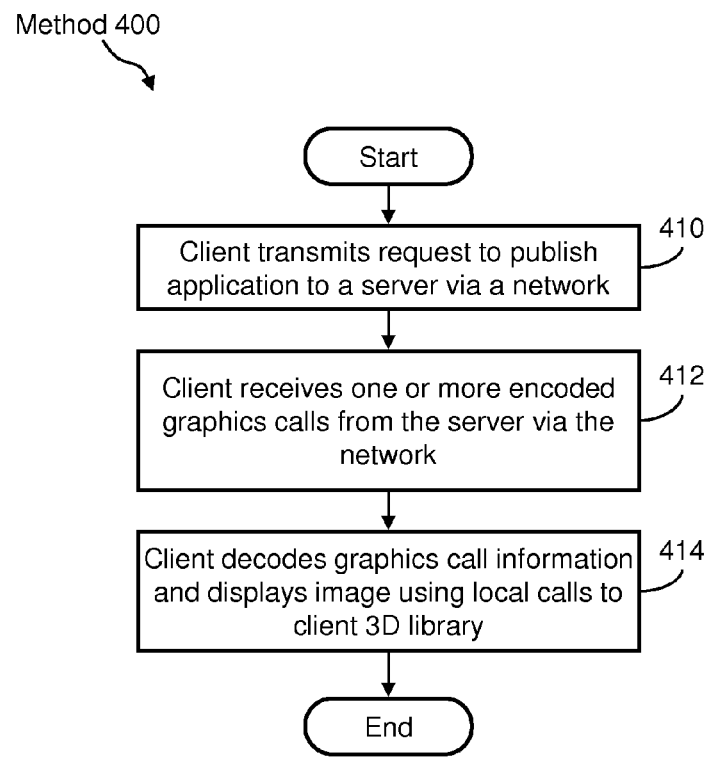
FIG. 4 illustrates a flow diagram of a method of displaying graphic objects on a client in a client-server computing system, according to a minimum configuration of the present disclosure.

FIG. 4 illustrates a flow diagram of a method 400 of displaying graphic objects on a client in a client-server computing system, according to a minimum configuration of the present disclosure. Method 400 may include, but is not limited to, the following steps:

At a step 410, client 120 transmits a request to server 110 to publish an application to client 120 via network 140. For example, a request to draw a 3D cube can be made by client 120. Optionally, the request can include information about relevant capabilities of client 120, such as the version or versions of client 3D library 124 supported on client 120.

At a step 412, client 120 receives a transmission including one or more graphics calls from server 110 via network 140. The graphics call(s) relate to the client's original request made at 410. For example, if the original request is to draw a 3D cube, the graphics calls may relate to geometric operations and/or rendering options, such as blending or shading.

At a step 414, client 120 decodes the one or more graphics calls from the transmission. Then, based on the received graphic calls, client 120 executes each of the graphics commands using calls to client 3D library 124. After execution of the graphics commands, an image (or a series of images representing motion) of a graphic object (or objects) is output to display 130.

What is claimed is:

1. A server computing system for providing cross-platform remote access to three dimensional (3D) graphics applications, the server computing system comprising:
   memory for storing a server application having a resident 3D library;
   a communication interface for receiving a request over a network from a client device to access the server application; and
   a processor for executing instructions stored in memory, wherein execution of the instructions by the processor:
      determines that the request from the client device pertains to a graphics call to the resident server 3D library, and
      encodes the determined graphics call for a resident client 3D library on the client device,
   wherein the communication interface:
      transmits the encoded graphics calls to the client device, the encoded graphics call associated with the request; and
      exchanges capability information with the client device by sending information regarding the resident server 3D library and/or receiving information regarding the resident client 3D library.

2. The system of claim 1, wherein the resident server 3D library and the resident client 3D library are associated with different operating systems.

3. The system of claim 1, wherein the resident server 3D library and the resident client 3D library include one or more graphics functions in common.

4. The system of claim 1, wherein the capability information includes one or more application program interfaces (APIs) supported by the server.

5. The system of claim 1, wherein the processor encodes the determined graphics call by assigning an ID to each graphics function and converting one or more function arguments from a platform-specific byte order into a common byte order.

6. A method for providing cross-platform remote access to three dimensional (3D) graphics applications, the method comprising:
   storing a server application having a resident server 3D library in memory of a server;
   receiving a request at the server, the request sent over a communication network from a client device regarding access to the server application;
   executing instructions stored in memory, wherein execution of the instructions by a processor:
      determines that the request from the client device pertains to a graphics call to the resident server 3D library, and
      encodes the determined graphics calls for a resident client 3D library;
   transmits the encoded graphics calls from the server to the client device, the encoded graphics call associated with the request; and
   exchanges capability information with the client device by sending information regarding the resident server 3D library and/or receiving information regarding the resident client 3D library.

7. The method of claim 6, wherein the resident server 3D library and the resident client 3D library are associated with different operating systems.

8. The method of claim 6, wherein the resident server 3D library and the resident client 3D library include one or more graphics functions in common.

9. The method of claim 6, wherein the capability information includes one or more application program interfaces (APIs) supported by the server.

10. The method of claim 6, wherein encoding the determined graphics call comprises assigning an identifier (ID) to each graphics function and converting one or more function arguments from a platform-specific byte order into a common byte order.

11. A non-transitory computer-readable storage medium, having embodied thereon a program executable by a processor to perform a method for providing cross-platform remote access to three dimensional (3D) graphics applications, the method comprising:
   storing a server application having a resident server 3D library;
   receiving a request from a client device to access the server application;
   determining that the request from the client device pertains to a graphics call to the resident server 3D library;
   encoding the determined graphics calls for a resident client 3D library;

transmitting the encoded graphics calls to the client device, the encoded graphics call associated with the request; and exchanging capability information with the client device by sending information regarding the resident server 3D library and/or receiving information regarding the resident client 3D library.

12. The non-transitory computer-readable storage medium of claim 11, wherein the resident server 3D library and the resident client 3D library are associated with different operating systems.

13. The non-transitory computer-readable storage medium of claim 11, wherein the resident server 3D library and the resident client 3D library include one or more graphics functions in common.

14. The non-transitory computer-readable storage medium of claim 11, wherein the capability information includes one or more application program interfaces (APIs) supported by the server.

15. The non-transitory computer-readable storage medium of claim 11, wherein encoding the determined graphics call comprises assigning an identifier (ID) to each graphics function and converting one or more function arguments from a platform-specific byte order into a common byte order.

* * * * *